United States Patent [19]

Shimaoka

[11] Patent Number: 4,485,464
[45] Date of Patent: Nov. 27, 1984

[54] DOOR OPENING AND CLOSING MECHANISM FOR DISC DRIVING APPARATUSES

[75] Inventor: Motohiro Shimaoka, Furukawa, Japan

[73] Assignee: Alps Electric Co., Ltd., Tokyo, Japan

[21] Appl. No.: 431,022

[22] Filed: Sep. 30, 1982

[30] Foreign Application Priority Data

Nov. 16, 1981 [JP] Japan ................................ 56-184734

[51] Int. Cl.³ .............................................. G11B 1/00
[52] U.S. Cl. ...................................... 369/77.1; 312/8; 360/97
[58] Field of Search .................... 369/75.1, 77.1, 77.2; 312/8; 360/93, 96.1, 96.5, 97, 99

[56] References Cited

U.S. PATENT DOCUMENTS

| | | | |
|---|---|---|---|
| 3,521,888 | 7/1970 | Kaneda | 360/93 |
| 4,040,106 | 8/1977 | Medley | 360/99 |
| 4,139,876 | 2/1979 | Owens | 360/97 |
| 4,179,718 | 12/1979 | Rolph | 360/99 |
| 4,405,957 | 9/1983 | Vorbach et al. | 360/97 |
| 4,408,321 | 10/1983 | Yamamura | 369/77.2 |

FOREIGN PATENT DOCUMENTS 58167  5/1981  Japan ................................ 369/77.1

*Primary Examiner*—Steven L. Stephan
*Attorney, Agent, or Firm*—Guy W. Shoup; Gerard F. Dunne

[57] ABSTRACT

A door opening and closing mechanism for disc driving apparatuses, comprising a chassis, a frame fastened pivotably to the chassis and having a door member holding portion at a free end thereof, a door member consisting of a cross-sectionary L-shaped operating portion with projections on both side surfaces thereof, and a mounting portion slidably held in the door member holding portion of the frame. A coiled spring is provided between pivotable frame and door member so as to constantly urge the door member against a rear surface of a front panel, and the projections provided on the operation portion of the door member are engageable with recesses in the back surface of a front panel. An elongated opening is provided in the front panel and receives a disc cartridge thereinto, the elongated opening being opened and closed by and with the door member. The mechanism has fewer parts than the conventional mechanism, and can be manufactured efficiently at a lower cost.

10 Claims, 20 Drawing Figures

DOOR OPENING AND CLOSING MECHANISM FOR DISC DRIVING APPARATUSES

BACKGROUND OF THE INVENTION

1. Field of the Invention

This invention relates to a door opening and closing mechanism for disc driving apparatuses.

2. Description of the Prior Art

The conventional door opening and closing mechanism for a disc drive apparatus typically includes an operating button for opening a door member, and a separate locking member for maintaining the door member in a closed state. Such mechanisms typically requires a plurality of parts which leads to inefficiencies in assembly and also complicates the door opening and closing operations.

SUMMARY OF THE INVENTION

An object of the present invention is to provide an inexpensive door opening and closing mechanism for disc driving apparatuses, which enables the door opening and closing operations to be carried out simply, and which has fewer parts and a more simple construction than conventional mechanisms.

The above and other objects as well as advantageous features of the invention will become apparent from the following description of the preferred embodiment taken in conjunction with the accompanying drawings.

BRIEF DESCRIPTION OF THE DRAWINGS

The accompanying drawings illustrate an embodiment of the present invention, wherein.

DESCRIPTION OF THE PREFERRED EMBODIMENT

Figure 1A:
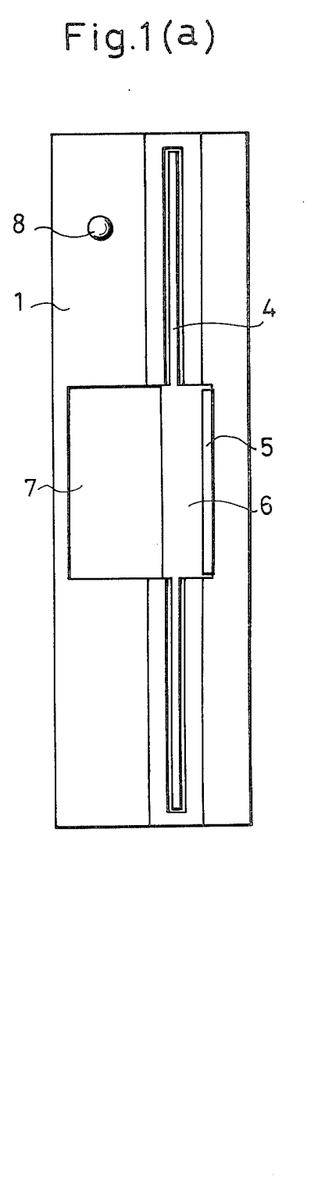
FIGS. 1a and 1b are front elevational views.
Figure 1B:
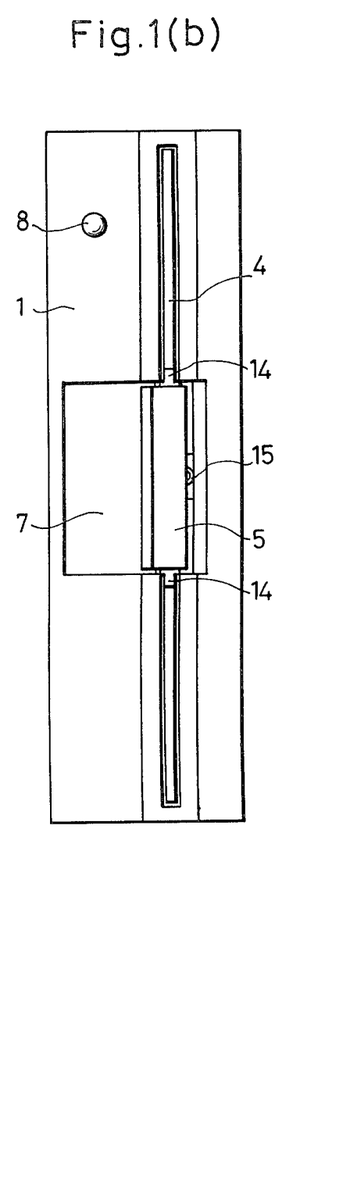

An embodiment of the present invention will now be described with reference to the drawings. Reference numeral 1 denotes a front panel molded out of a synthetic resin. The front panel 1 is provided with an elongated opening 4, into which a disc cartridge 2 containing a flexible magnetic disc 3 can be inserted. The front panel 1 is further provided substantially in the central portion thereof with an opening 6, in which a door member 5 for restricting the action of inserting the disc cartridge 2 is positioned. (Refer to FIG. 1a.) Reference numeral 7 denotes a recess in the front panel for receiving fingers to enable the door member to be operated easily. A display lamp 8 is provided in the front panel for indicating the operational condition of a means for driving the flexible magnetic disc 3, and a chassis 9 is formed by punching a metal plate, and bending the punched product. The chassis 9, front panel 1, and two side panels 10, 11 molded out of a synthetic resin constitute a casing.

Figure 2:
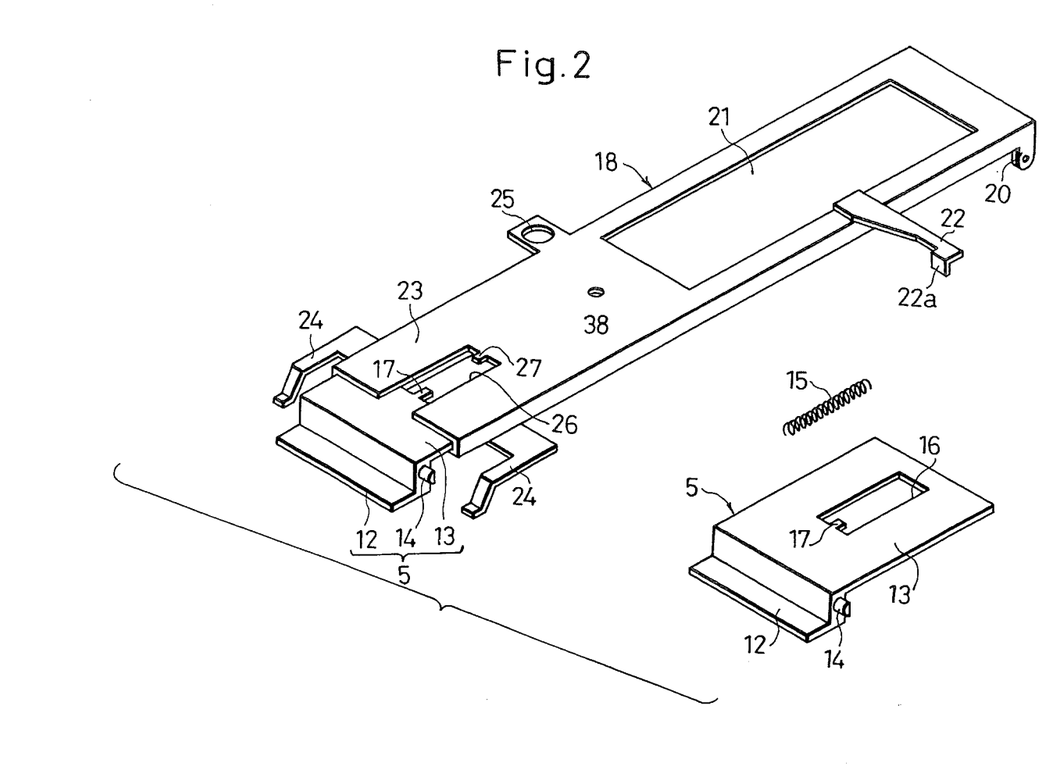
FIG. 2 is a perspective view of a pivotable frame 18.
Figure 3:
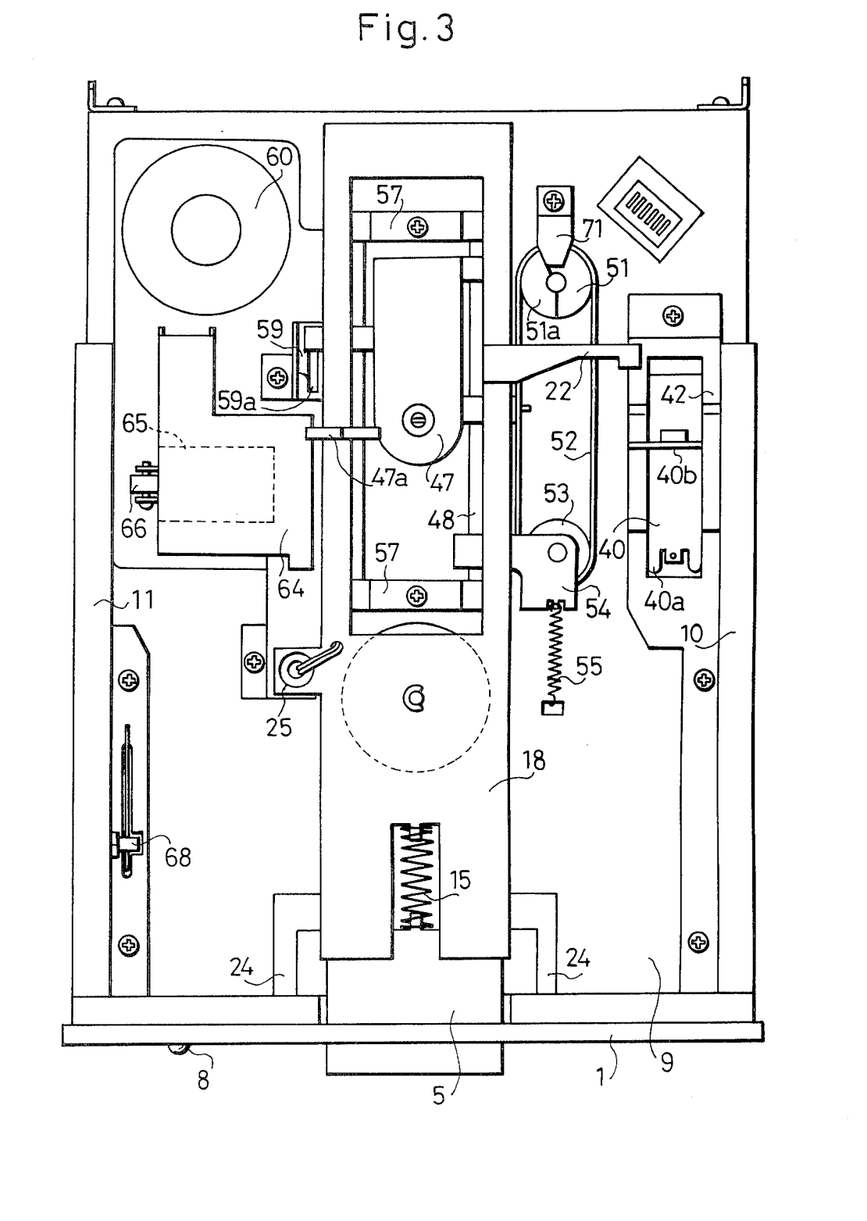
FIG. 3 is a top plan view.

The door member 5 is made of a synthetic resin, and, as shown in FIG. 2, consists of an L-shaped operating portion 12 and a mounting portion 13. Extending laterally outwards from the sides of the operating portion 12 on both sides thereof with projections 14 for regulating the door opening and closing operations. The mounting portion 13 is provided with an opening 16 receiving a coiled spring 15 for urging the door member 5 toward the front panel, and a projection 17 as provided in the opening 16 for receiving the coiled spring 15. A pivotable frame 18 formed from a metal plate has the door member 5 and a disc holder 19 mounted thereto. The pivotable frame 18 is provided with pivotable supports 20 at one end portion thereof, an opening 21, an arm 22, a door member-holding portion 23 at its other end, holding members 24 extending laterally from respective longitudinal sides of the pivotable frame 18, and a mount 25 for holding a sector detecting optical semiconductor element. (Refer to FIG. 2.) The door member holding portion 23 of the pivotable frame 18 is capable of holding the mounting portion 13 of the door member 5, and is provided with a recess 26 corresponding with the recess 16 for receiving the coiled spring 15, and a projection 27 at an inner end of the recess 26. A projection 27 is provided at the other end of the recess 26 and the coiled spring 15 can thus be compressed between the projections 17 and 27 to urge the door member 5 leftwardly in FIG. 2. The frame 18 is connected pivotably to the chassis 9 via pins through the supports 20, and the end portion of the frame 18 adjacent the door member 5 is urged upwardly at a predetermined angle with respect to the surface of the chassis 9 by a U-shaped spring.

Figure 5:
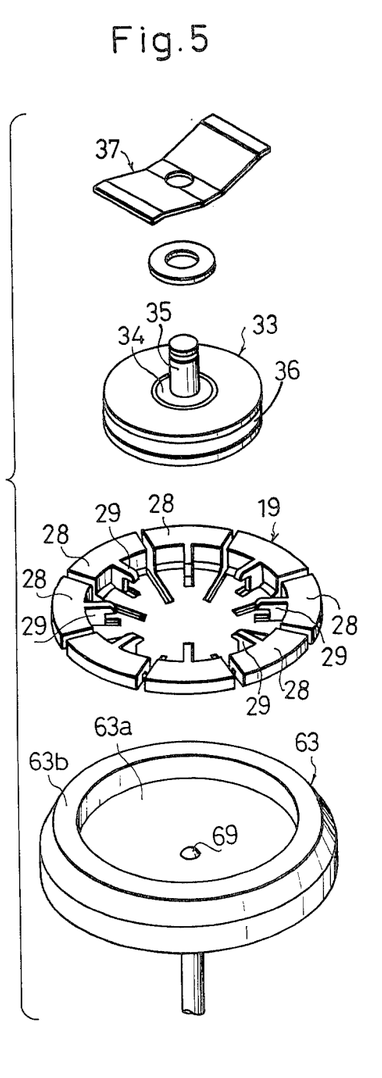
FIG. 5 is an exploded view in perspective illustrating a disc holder 19 and a driving hub 63.
Figure 6:
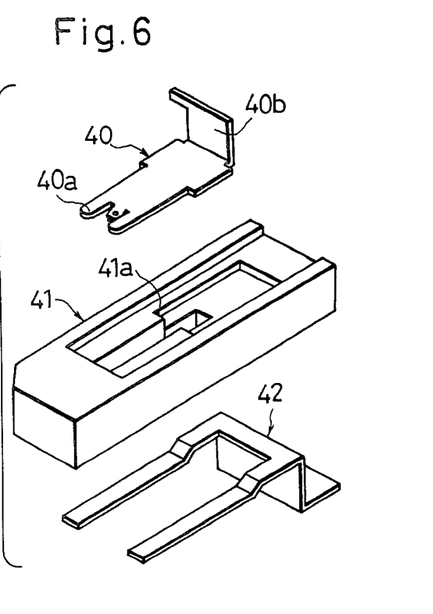
FIG. 6 is an exploded view in perspective of a disc cartridge discharge mechanism.
Figure 10A:
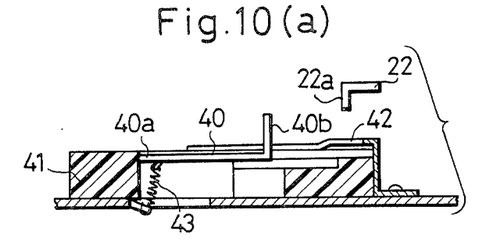
FIGS. 10a, 10b, 10c and 10d illustrate an operation of a disc discharge mechanism.
Figure 10B:
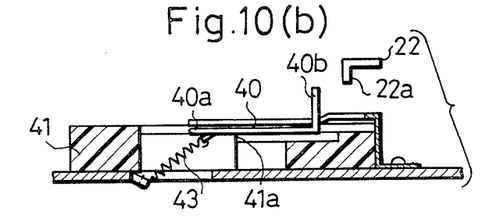
Figure 10C:
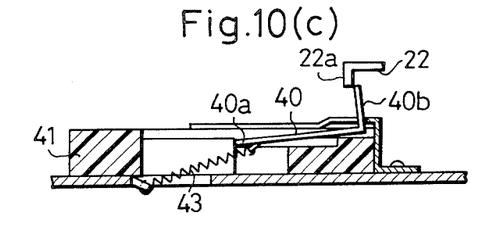
Figure 10D:
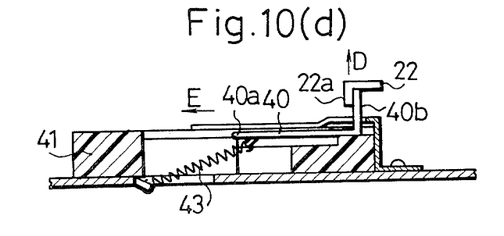
Figures 11A, 11B:
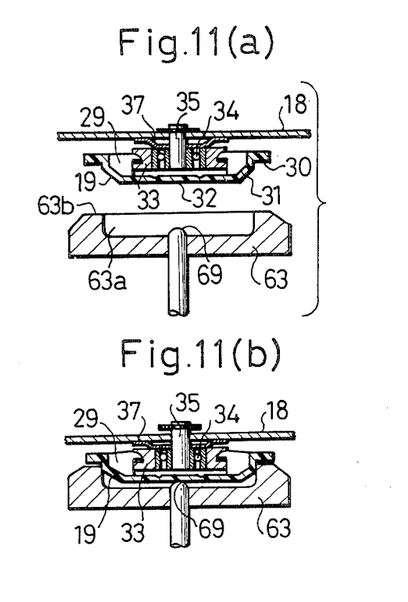
FIGS. 11a and 11b are side elevational views in section of a principal portion of a mechanism for holding a flexible magnetic disc.

Referring to FIG. 5 a disc holder 19 formed of a synthetic resin is fastened rotatably to the pivotable frame 18. The disc holder 19 is provided in a circumferential surface thereof with a plurality of regularly-spaced slots extending inward in the radial direction so as to form a plurality of arms 28. Each of these arms has a sufficiently high resilient force and is provided on the inner surface thereof with a projection 29, which extends toward the center of the disc holder 19, and has an inner portion with a downwardly sloping upper surface. As shown in FIG. 11(a) illustrating the assembled disc holder in section, the disc holder 19 has a flat wall portion 30 adapted to extend generally coplanar to the flexible magnetic disc 3 for supporting the disc, an inclined guide wall portion 31, and a bottom wall 32. A support member 33 is mounted on a shaft 35 via a bearing 34. The support member 33 is provided in the outer circumferential surface thereof with a groove 36 which receives the tapering free end portions of the projections 29 of the disc holder 19 to join the disc holder 19 to the support member 33. A washer and a plate spring 37 are placed around the shaft 35, and an E washer on the other side thereof to fix the disc holder 19 to the pivotably frame 18. As shown in FIG. 6, a mechanism for discharging a disc from the device includes a substantially L-shaped movable discharge member 40, a receiving block 41 formed from a synthetic resin, in which the discharge member 40 is slidingly received, a holding member 42 for constantly retaining the movable discharge member 40 within the receiving block 41, and a coiled spring 43 shown in FIG. 10(a) which is adapted to urge the movable discharge member constantly downward.

Figure 7:
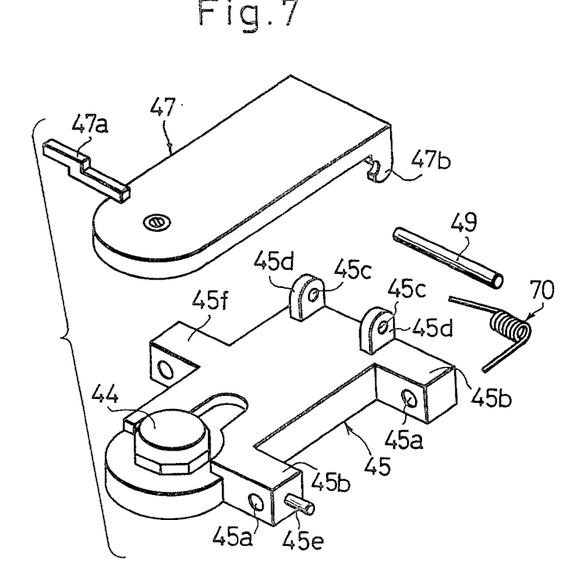
FIG. 7 is an exploded view in perspective illustrating a base 45 and a movable member 47.

A head carriage positioned substantially in the opening 21 of the pivotable frame 18 includes a base 45, to which a head 44 for carrying out writing and reading operations is fixed, and a movable member 47, carrying a pad 46 for pressing the flexible magnetic disc 3 against the head 44 is. Reference numeral 70 denotes a spring for urging the movable member 47 constantly toward the base 45. The base 45 is provided with guide portions 45b having guide bores 45a, through which a guide shaft 48 is inserted, and mounting portions 45d having respective bores 45c, through which a pin 49 for fastening the movable member 47 to the base 45 is inserted. The movable member 47 is provided with a long, narrow arm 47a, and mounting portions 47b by which the movable member 47 is fastened to the base 45.

Figure 8:
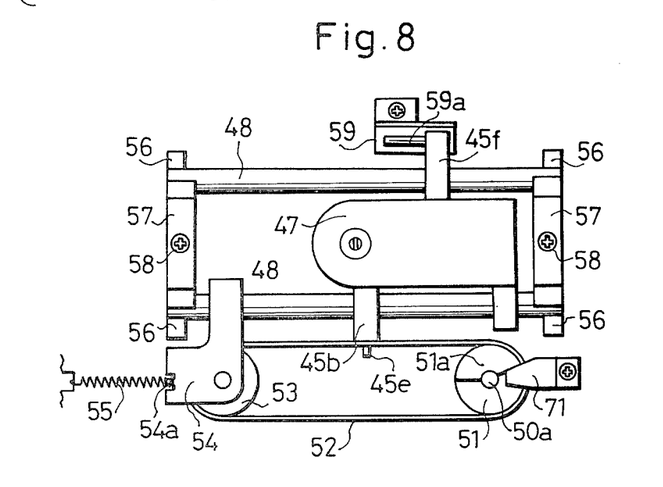
FIG. 8 is a top plan view of a carriage driving mechanism.

A head carriage driving mechanism has as a driving power source therefor a stepping motor 50 attached to a rear surface of the chassis 9. Reference numeral 51 denotes a pulley mounted directly on a rotary shaft 50a of the stepping motor 50. A belt 52 consisting of a thin metal strip is passed around the pulley 51, and fixed to the same with screws. Reference numeral 53 denotes another pulley rotatably fixed to a mount 54, and the belt 52 is also passed around the pulley 53. The mount 54 is formed substantially in the shape of the letter "L", and is provided with a bore for movably fixing the mount 54 around the shaft, and an engaging portion 54a for use in fastening thereto one end of a coiled spring 55, by which the mount 54 is drawn in one direction. Owing to the resilient force of the coiled spring 55, the endless belt 52 wrapped around the pulleys 51, 53 is kept constantly taut, so that there is no slack in belt 52. The belt 52 is provided with a bore, into which a projection 45e extending from the free end of the guide portion 45b of the base 45 is inserted. When the stepping motor 50 is energized, the pulley 51 rotates causing the belt 52 to move, and the head carriage is moved accordingly.

A pair of guide shafts 48 slidably supporting the head carriage are set on projections 56 formed by bending the chassis 9. The guide shafts 48 are then pressed downward by holding members 57, which are fixed with screws 58. The guide shafts 48 are thus rigidly held to the chassis 9.

Figure 4:
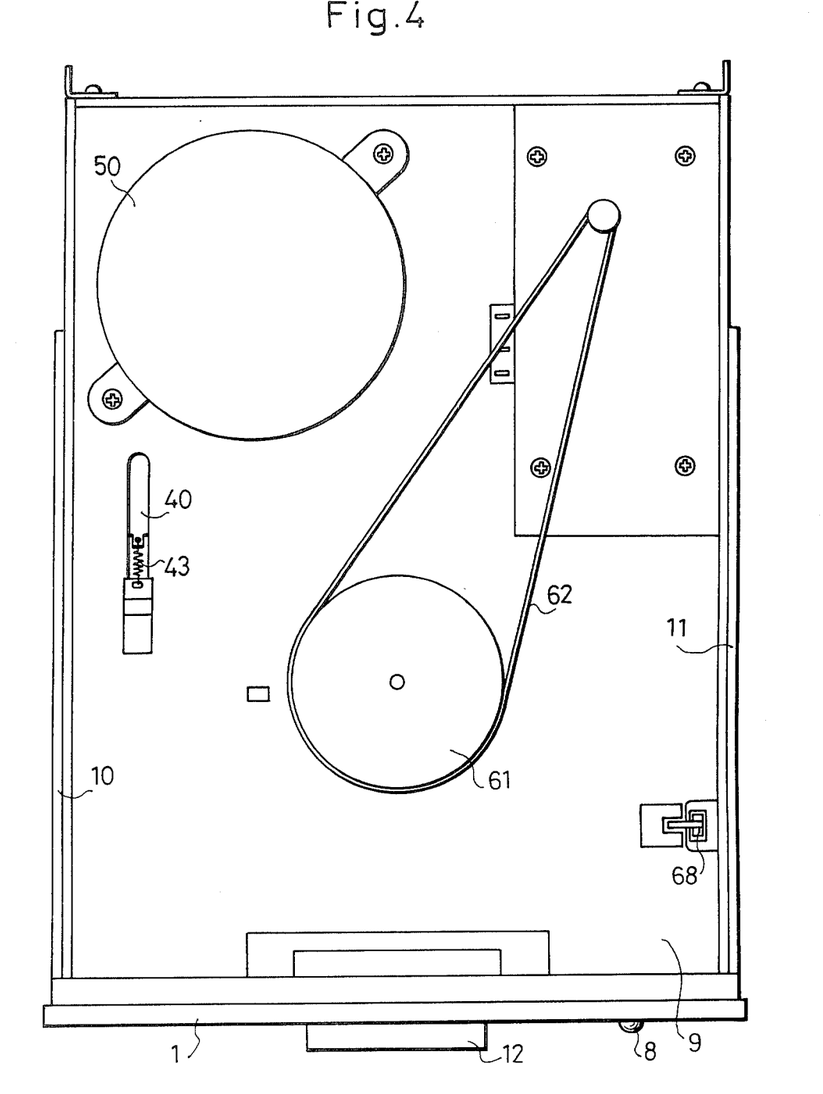
FIG. 4 is a bottom plan view.

Reference numeral 59 denotes a micro-switch provided on the chassis 9 at a location s0 that an operating member 59a carried by a projection 45f. 45b of the base 45 may be slidingly moved into a slot of the micro-switch. A dc motor 60 is provided on the upper side of the chassis 9 for driving via a driving belt 62 shown in FIG. 4 a rotary plate 61 attached to a driving hub 63, to rotate the flexible magnetic disc 3.

Reference numeral 64 denotes a disc pressing member formed by bending a resilient metal plate, for example, a phosphor bronze plate. The disc pressing member 64 is pivoted by a plunger 66, which is driven by an electromagnetic solenoid 65. A resilient member 67, a sponge, for example, is glued onto the portion of the member 64 by which the disc cartridge 2 containing a flexible magnetic disc therein is pressed. Reference numeral 68 denotes a writing prevention detecting mechanism positioned in the vicinity of the side panel 11.

Figure 9A:
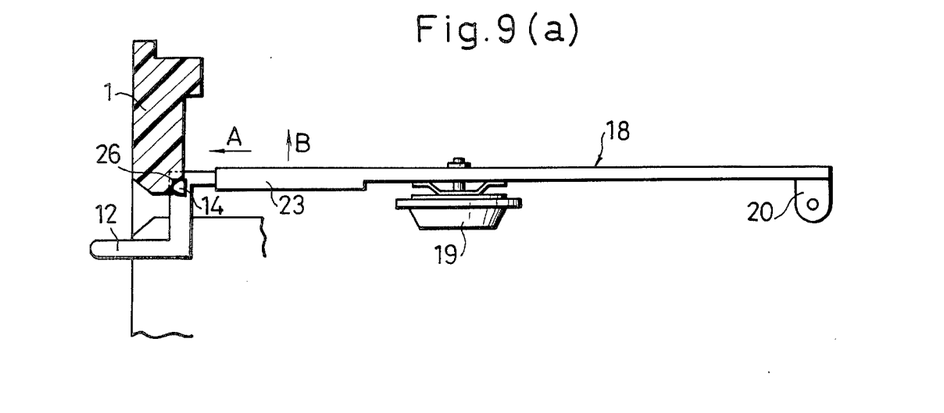
FIGS. 9a and 9b illustrate a principal portion of a door member 5 being opened and closed.
Figure 9B:
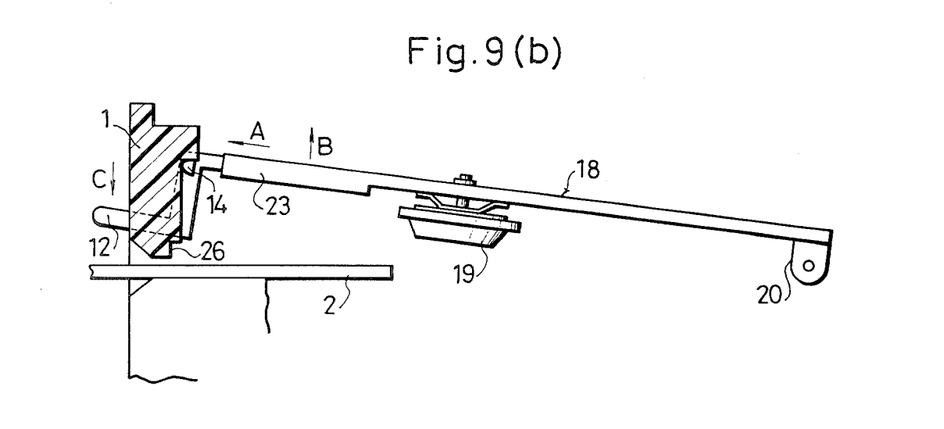

The operations for opening and closing the door member 5 will be now described with reference to FIGS. 9(a) and 9(b). The door member 5 joined to the pivotable frame 18 is constantly urged in the direction of an arrow A by the coiled spring 15 with a pivotal force being applied to the frame 18 in the direction of an arrow B by the resilient force of a U-shaped spring at the pivotal connection 20. When the operating portion 12 is moved in the direction of an arrow C against the force of the U-shaped spring with the door member 5 in an opened state as shown in FIG. 9b, the projections 14 provided on the operating portion 12 are moved along the rear surface of the front panel 1, and the mounting portion 13 of the door member 5 gradually moves inwardly against the force of the coiled spring 15 into the door member-holding portion 23 of the pivotable frame 18. When the projections 14 of the operating portion 12 have reached the portion of the rear surface of the front panel 1 which corresponds to the recess 26, the door member 5 is moved in the direction of the arrow A due to the force of the coiled spring 15, so that the projections 14 engage the recess 26 to hold the pivotable frame 18 in a portion more parallel to the plane of the disc inserted in the device. When the operating portion 12 of the door member 5 is pushed inwardly with the door member 5 in the condition shown in FIG. 9a, the projections 14 are disengaged from the recess 26, and the frame 18 can pivot in the direction of the arrow B due to the force of the U-shaped spring to return to the position shown in FIG. 9b.

The operation of the mechanism for discharging a flexible magnetic disc will be described in detail with reference to FIG. 10. When the disc cartridge 2 is inserted into the elongated opening 4 in the front panel 1 with the door member 5 opened, it is guided by grooves provided in the inner surfaces of the side panels 10 and 11, and a rear end portion of the cartridge 2 then comes into engagement with the bent portion 40b of the movable discharge member 40. (FIG. 10a) When the disc cartridge 2 is further moved, the discharge member 40 is moved (FIG. 10b) against the force of the coiled spring 43. When the forward end portion 40a of the discharge member 40 has passed by stepped portion 41a, the end portion 40a drawn downward by the coiled spring 43 and is urged against the stepped portion 41a, while the bent portion 40b at the other end of the discharge member 40 is moved slightly upward to engage the end portion 22a of the arm 22 fastened to the pivotable frame 18. (Refer to FIG. 10c) The operation for inserting the disc cartridge 2 into the opening 4 is thus completed. When the door member 5 then pivots and is closed, the arm 22 provided on the pivotable frame 18 is moved to cause the bent portion 40b of the movable discharge member 40 to be pressed downward by the end portion 22a of the arm 22. Consequently, the end portion 40a is lifted upward and moves forward slightly to become disengaged from the stepped portion 41a of the receiving block 41, and the movable discharge member 40 is kept in the condition shown in FIG. 10d. When the door member 5 is closed, the flexible magnetic disc 3 is held by the driving hub 63 and disc holder 19, so that writing or reading operation from the head 44 is ready to begin. When the door member 5 pivots after writing or reading of data has been completed, the door member 5 is opened, and the frame 18 also pivots at the same time, so that the arm 22 moves in the direction of the arrow D. Consequently, the free end portion 22a of the arm 22 and the bent portion 40b of the movable discharge member 40 are disengaged from each other, so that discharge member 40 is moved rapidly in the direction of the arrow E due to the force of the coiled spring 43 to discharge the disc cartridge 2 out of the door opening and closing mechanism.

The mechanism for holding a flexible magnetic disc will now be described in detail with reference to FIGS. 11(a) and 11(b). When the frame 18 is moved pivotally with a central hole in the flexible magnetic disc 3 positioned between the disc holder 19 and driving hub 63, the disc holder 19 fastened to the frame 18 is moved, and the inclined guide wall 31 of the disc holder 19 begins to enter the hole in the disc 3. The disc holder 19 is inserted into the hole in the disc as the position of the disc 3 is corrected by the inclined surfaces of the guide wall 31. Since the disc holder 19 and a recess 63a in the driving hub 63 are positioned directly opposite each other, the holder 19 is inserted accurately into the hub 63. A projection 69 provided in the center of the recess 63a in the driving hub 63 comes into contact with the center of the bottom wall 32 of the disc holder 19. When the disc holder 19 is further moved downward, the center of the bottom wall 32 is pressed, so that the disc holder 19 is deformed within the range of elasticity thereof. Namely, the arms 28 are flexed in such a manner that they expand slightly outward. As shown in FIG. 11b, the expanding arms 28 of the disc holder 19 can press against the side walls of the hole in the disc 3 so as to forcibly engage the disc, and the disc supporting wall 30 presses the disc 3 against an upper surface 63b of the driving hub 63. Thus, the flexible magnetic disc 3 is held securely by the disc holder 19 and driving hub 63. This allows the rotation of the DC motor 60 to be transmitted accurately to the disc 3 via the driving hub 63.

An operation for driving the carriage consisting of the base 45 provided with the head 44, and movable member 47 provided with the pad 46 will be described. The base 45, to which the head 44 is fixed, is slidingly movable via the guide shafts 48, and adapted to be driven by the belt 52 wrapped around two pulleys 51 and 53. The rotary shaft 50a of the stepping motor 50 is tightly fitted in the pulley 51. When the stepping motor 50 is rotated, the belt 52 fixed to the pulley 51 with screws is moved, and the base 45 is also moved therewith. Since tension of the belt 52 is constantly maintained by the coiled spring 55 as mentioned above via the pulley 53 freely joined to the mount 54, the base 45 can be moved accurately. A fan-shaped cam 51a engaged with a stopper 71 is formed on the pulley 51 so as to prevent the carriage from being moved too far. The operating member 59a for the micro-switch 59 is positioned on one side of a passage, in which a third guide portion 45f is moved. When the carriage is moved to a zero track position, the micro-switch 59 is operated to stop the movement thereof. The carriage can be moved by the stepping motor 50 between the zero track position and 35 track position.

Figures 12A, 12B:
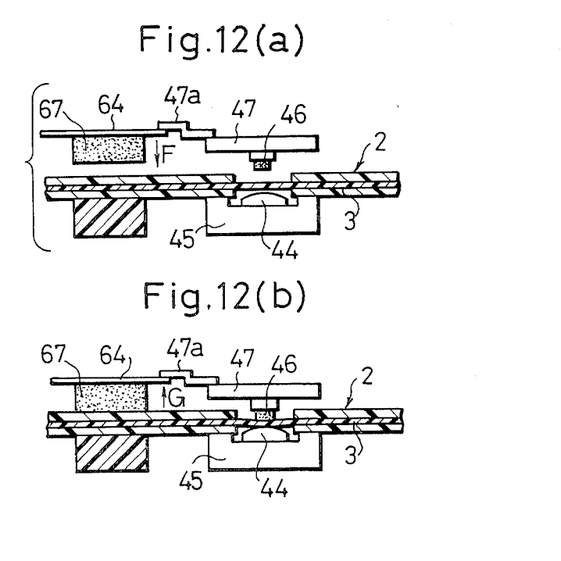
FIGS. 12a and 12b are sectional view in section of a principal portion of a flexible magnetic disc, illustrating writing and reading operations with respect thereto.
Figure 13:
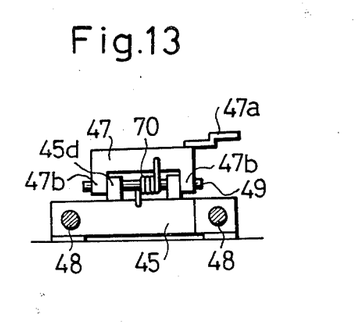
FIG. 13 is a rear elevational view, illustrating the base 45 and movable member 47.

The operations for writing and reading data in and from the flexible magnetic disc 3 by the head 44 provided on the carriage will be described. The disc cartridge 2 is inserted in a predetermined position with the door member 5 opened, and the door member 5 is then closed to hold the flexible magnetic disc 3 in a proper position by the disc holder 19 and driving hub 63. The flexible magnetic disc 3 is rotated at 300 r.p.m. by the dc motor 60. At this time, the disc 3 has not yet contacted the surface of the head 44 on the base 45, said disc 3, however, is in a position very close to the surface of the head 44. Although the movable member 47 provided with the pad 46 is driven toward the base 45 by the spring 70, the long, narrow arm 47a is engaged at the free end portion thereof with the upper surface of the disc pressing member 64. Accordingly, the pad 46 is not in contact with the surface of the disc 3; it is poised above it (FIG. 12a). The electromagnetic solenoid 65 is excited by a head load signal to attract the plunger 66 thereto, so that the disc pressing member 64 is moved in the direction of an arrow F. When the disc pressing member 64 is moved toward the disc cartridge 2, the member 47 is moved in accordance therewith. The pad 46 provided on the movable member 47 comes into contact with the surface of the disc 3, which is brought into engagement with the surface of the head 44, as the disc cartridge 2 is lightly pressed by the elastic member 67 glued on the disc pressing member 64, to cause the disc in rotary motion to be pressed lightly thereby. Thus, the disc 3 can be kept in stable contact with the head 44. The data are then written in or read from the disc 3 by the head 44. When an head unload signal is generated after the writting or reading of data has been finished, the electromagnetic solenoid 65 de-energized, and the plunger 66 returns to the original position, so that the disc pressing member 67 is moved in the direction of the arrow G. At the same time, the movable member 47 is raised upward so that the pad 46 separates from the surface of the disc 3. Thus, the head 44 and disc 3 are separated.

As described above, the door opening and closing mechanism for disc driving apparatuses according to the present invention includes a door member, a mounting portion of which is slidably held in a door member holding portion of a pivotable frame attached to a chassis, a spring provided between the pivotable frame and door member for constantly urging the door member against the rear surface of a front panel, and a recess provided in the rear surface of the front panel for receiving projections provided on an operating portion of the door member. When the operating portion is moved pivotally with the fingers, the door member can be opened and closed simply. Therefore, unlike the conventional door opening and closing mechanism, the present invention does not require an operating button for opening the door member, nor a locking member for maintaining the door member in a closed state. This allows the number of parts to be minimized, and the construction to be simplified. Therefore, the present invention permits providing an inexpensive door opening and closing mechanism for disc driving apparatuses, which can be efficiently assembled and has a very marked practical effect on operation.

The present invention is not, or course, limited to the above embodiment; it may be modified in various ways within the scope of the appended claims.

What is claimed is:

1. A door opening and closing mechanism for disc driving apparatuses comprising a chassis and a front panel having a rear surface, an elongate frame fastened pivotably at one end portion to said chassis and having means at the other end portion thereof for holding a door member, a door member consisting of an operating portion and a mounting portion slidably held in said holding means of said pivotable frame, means including a spring provided between said pivotable frame and said door member for constantly urging said door member against the rear surface of said front panel, an elongated opening provided in said front panel for receiving a disc cartridge thereinto, recesses provided in said rear surface of said front panel, and means including projections provided on said operating portion of said door member and adapted to be fitted within said recesses for holding said door member across said elongated opening.

2. A door opening and closing mechanism for disc driving apparatuses according to claim 1, wherein said spring consists of a coiled spring provided between a projection formed on said door member holding portion of said pivotable frame and a projection provided on said door member.

3. A door opening and closing mechanism for disc driving apparatuses according to claim 1, wherein said pivotable frame is further provided with a pair of holding members at those sections thereof which are in the vicinity of said door member holding portion thereof.

4. A door opening and closing mechanism for disc driving apparatuses according to claim 1, wherein said operating portion of said door member has an L-shaped cross section and said projections project laterally from respective side surfaces thereof.

5. A disc-driving apparatus including a front panel having an elongate opening for inserting a disc into said apparatus, an elongate frame member connected pivotally at a rear portion thereof and extending forwardly towards said front panel, said frame member carrying means at a central portion thereof for holding a disc in location within said apparatus, said frame member being movable between a first position pivoted away from the location for a disc and a second position bringing said holding means into engagement with a disc in said location, and door means for holding said frame member in said second position and blocking said elongate opening, said door means including a door member fitted slidably to the forward end portion of said frame member and biased resiliently towards said front panel and co-acting means formed respectively on said door member and the rear surface of said front panel for holding said frame member in said second position so as to be released therefrom as said door member is pushed inwardly of said apparatus.

6. A disc-driving apparatus as defined in claim 5, including means resiliently biasing said frame member towards its first position.

7. A disc-driving apparatus as defined in claim 6, said co-acting means including projections extending laterally from said door member and complementary recesses formed in the rear surface of said front panel for receiving said projections.

8. A disc-driving apparatus as defined in claim 7, the rear surface of sad front panel further having a step position adapted to engage said projections when said frame member is in said second position.

9. A disc-driving apparatus as defined in claim 5, said co-acting means including projections extending laterally from said door member and complementary recesses formed in the rear surface of said front panel for receiving said projections.

10. A disc-driving apparatus as defined in claim 9, the rear surface of said front panel further having a step portion adapted to engage said projections when said frame member is in said second position.

* * * * *